United States Patent
Beau et al.

(10) Patent No.: US 8,317,247 B2
(45) Date of Patent: Nov. 27, 2012

(54) MOTOR-VEHICLE LINING PANEL COMPRISING A SHARPLY BACK-LIT PICTOGRAM

(75) Inventors: Godefroy Beau, La Garenne Colombes (FR); Jean-Francois Oeuvrard, Cergy Pontoise (FR); Pierre Guerreiro, Eaubonne (FR)

(73) Assignee: Faurecia Interieur Industrie, Nanterre (FR)

( * ) Notice: Subject to any disclaimer, the term of this patent is extended or adjusted under 35 U.S.C. 154(b) by 58 days.

(21) Appl. No.: 12/990,863

(22) PCT Filed: May 5, 2009

(86) PCT No.: PCT/FR2009/050821
§ 371 (c)(1),
(2), (4) Date: Nov. 3, 2010

(87) PCT Pub. No.: WO2009/141555
PCT Pub. Date: Nov. 26, 2009

(65) Prior Publication Data
US 2011/0057465 A1 Mar. 10, 2011

(30) Foreign Application Priority Data
May 6, 2008 (FR) ...................................... 08 53007

(51) Int. Cl.
*B60R 7/04* (2006.01)
*B60J 5/00* (2006.01)
(52) U.S. Cl. ................. 296/1.07; 296/37.13; 296/146.7; 296/187.03
(58) Field of Classification Search ................. 296/1.08, 296/1.07, 187.03, 193.09, 72, 70, 74, 191, 296/1.09, 146.7, 187.05; 280/752
See application file for complete search history.

(56) References Cited

U.S. PATENT DOCUMENTS

| | | | |
|---|---|---|---|
| 6,160,475 A * | 12/2000 | Hornung et al. | 340/461 |
| 6,464,381 B2 * | 10/2002 | Anderson et al. | 362/488 |
| 7,210,829 B2 * | 5/2007 | Okazaki et al. | 362/489 |
| 7,237,933 B2 * | 7/2007 | Radu et al. | 362/488 |
| 2002/0101738 A1 | 8/2002 | Misaras | |
| 2006/0271261 A1 * | 11/2006 | Flores et al. | 701/49 |

FOREIGN PATENT DOCUMENTS

| DE | 29808949 U1 | 7/1998 |
|---|---|---|
| EP | 1495911 A1 | 1/2005 |
| FR | 2824510 A1 | 11/2002 |
| FR | 2877896 A1 | 5/2006 |
| JP | 2001191845 A | 7/2001 |

OTHER PUBLICATIONS
International Search Report, dated Jul. 1, 2010, from corresponding PCT application.
* cited by examiner

*Primary Examiner* — Glenn Dayoan
*Assistant Examiner* — Sunsurraye Westbrook
(74) *Attorney, Agent, or Firm* — Young & Thompson

(57) ABSTRACT

This panel (1) includes at least one zone (10) forming a pictogram (12), the pictogram (12) being illuminated by a light source (14) placed beneath the lining panel (1), the lining panel (1) having a translucent skin (2) forming the external surface (8) of the lining panel (1) and a support layer (4) placed against the skin (2) between the light source (14) and at least the zone (10) forming a pictogram (12). The support layer (4) has at least a first thickness ($e_1$) around the zone (10) forming the pictogram (12) and at least a second thickness ($e_2$) facing the zone (10) forming the pictogram (12), the second thickness ($e_2$) being smaller than the first thickness ($e_1$).

20 Claims, 1 Drawing Sheet

MOTOR-VEHICLE LINING PANEL COMPRISING A SHARPLY BACK-LIT PICTOGRAM

BACKGROUND OF THE INVENTION

1. Field of the Invention

Figure 1:
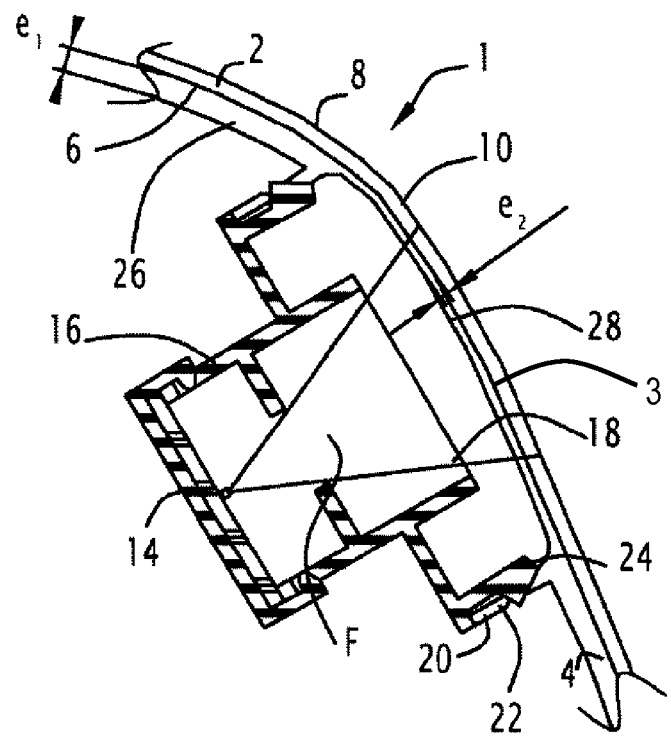

The present invention relates to a trim panel for motor vehicles, of the type comprising at least one zone forming a pictogram, said pictogram being illuminated by means of a light source placed under the trim panel, the trim panel comprising a translucent skin forming the external surface of the trim panel and a support layer placed against the skin between the light source and at least the zone forming the pictogram.

The invention also relates to a motor vehicle including such a trim panel.

The term "pictogram" should be understood to mean any figurative or symbolic drawing used for communication purposes, including alphanumeric signs.

2. Description of the Related Art

In the known panels of the type described hereinabove, the light source is placed under the support layer. The light therefore passes through the support layer then the translucent skin where it is diffused according to the form of the pictogram delimited by a mask. The document FR-2 824 510 describes, for example, a trim panel of this type.

However, the passage of the light into the support layer also results in a diffusion of the light inside the latter because of the crystallinity or the reinforcement of the polymer material forming the support layer. This results in a diffusion of the light outside the zone forming the pictogram. The image of the pictogram therefore becomes imprecise and the esthetic effect obtained is unsatisfactory.

One aim of the invention is to overcome this drawback by proposing a trim panel of the abovementioned type in which the lighting of the pictogram is produced accurately and the image obtained is sharp and stands out clearly from the surrounding zone.

SUMMARY OF THE INVENTION

To this end, the invention relates to a trim panel of the abovementioned type, in which the support layer has at least one first thickness around the zone forming the pictogram and at least one second thickness facing the zone forming the pictogram, the second thickness being less than the first thickness.

The reduced thickness of the support layer facing the pictogram zone makes it possible to shorten the path of the light rays in the support layer, which greatly limits their diffusion in this layer. There is thus obtained a sharply lit pictogram that stands out clearly from the surrounding zone.

According to other features of the trim panel:
the support layer is rigid;
the transition between the first thickness and the second thickness is made according to a substantially continuous transition slope, so as to reduce the thickness continuously between the first and the second thicknesses;
the transition slope is less than or equal to 10%;
the panel comprises a mask comprising at least one opening in the form of the pictogram, said mask allowing the light to pass through the opening and blocking said light around the opening, said mask being positioned in the path of the light passing between the light source and the translucent skin;
the mask is placed between the translucent skin and the support layer or between the support layer and the light source;
the mask is printed on the internal surface of the translucent skin or on the top surface or on the bottom surface of the support layer;
the mask is an independent element;
the support layer is made of a glass-fiber reinforced polymer material;
the first thickness is substantially comprised between 2.5 mm and 3 mm and the second thickness is substantially comprised between 1 mm and 2 mm; and
the support layer comprises fixing means for a box, the light source being placed in said box.

The invention also relates to a motor vehicle comprising a trim panel as described hereinabove, said panel being applied against at least a portion of the passenger compartment of said motor vehicle.

BRIEF DESCRIPTION OF THE DRAWING FIGURES

Figure 2:
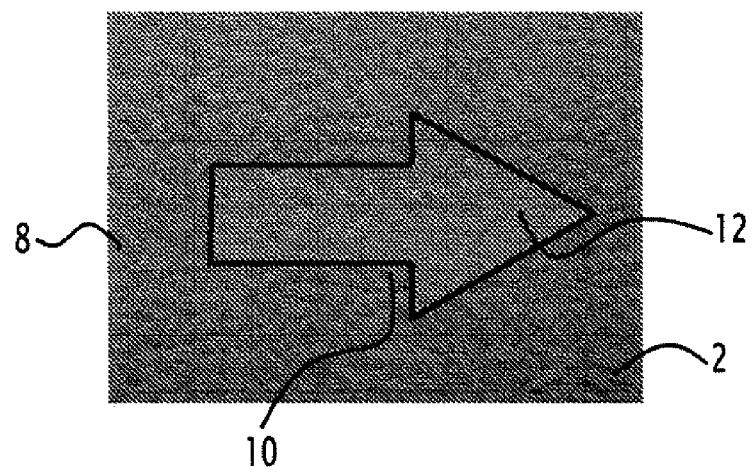

Other aspects and advantages of the invention will become apparent from reading the following description, given by way of example and with reference to the appended drawings, in which:

FIG. 1 is a diagrammatic cross-sectional representation of a portion of a trim panel according to the invention, FIG. 2 is a diagrammatic plan view representation of the skin showing the zone forming the pictogram when it is lit.

DETAILED DESCRIPTION OF THE INVENTION

In the description, the term "external" should be understood to mean that which is visible from the passenger compartment of the motor vehicle and the term "internal" should be understood to mean that which is not visible. The terms "top" and "bottom" are defined relative to a direction starting from the wall of the passenger compartment and going toward the interior of the passenger compartment.

With reference to FIG. 1, a trim panel 1 is described that comprises a translucent skin 2 and a support layer 4 placed against the internal surface 6 of the skin 2.

The support layer 4 is rigid. "Rigid" should be understood to mean a support layer 4 made of a material that does not crush significantly under the effect of a pressure, unlike a foam, for example, which is a flexible material. In a foam, the light is diffused by the presence of air bubbles in the material, whereas the rigid material of the support layer 4, the path of the light is not disturbed by the presence of air bubbles. The support layer is, for example, made of a glass-fiber reinforced translucent polymer material that adheres to the translucent skin 2, said support layer being, for example, overmolded directly on the skin 2. This assembly can be formed as required to adapt to the trim of a motor vehicle. The external surface 8 formed by the skin 2 is, for example, substantially flat or has relief or hollow zones, for example to indicate the presence of vehicle function control buttons under the skin 2/support layer 4 assembly.

At least one zone 10 of the trim panel 1 comprises a back-lit pictogram 12. The term "back-lit" should be understood to mean that a light source 14 is placed under the trim panel 1 and emits light in a beam F which is diffused in the translucent skin 2 in the zone 10.

As is known, the light source 14 is placed in a box 16, called "light box", comprising a top opening 18 covered by the trim panel 1. The light source 14 is, for example, a light-emitting diode. According to the embodiment represented in FIG. 1, the box 16 is fixed to the support layer 4 by fixing means 20 extending under the support layer 4. The fixing means 20 comprise, for example, tabs 22 extending from the internal surface of the support layer 4 and including openings for receiving fixing projections 24 provided on the box 16.

According to another embodiment, the box 16 is fixed to a support extending under the trim panel.

The support layer 4 has a first thickness $e_1$ in a zone 26 which extends around the zone forming the pictogram 10. In a zone 28 which extends facing the zone forming the pictogram 10, the support layer 4 has a second thickness $e_2$, less than $e_1$. According to one embodiment, the first thickness $e_1$ is substantially between 2.5 mm and 3 mm and the second thickness $e_2$ is substantially between 1 mm and 2 mm, preferably between 1.5 mm and 2 mm, and is, for example, equal to 1.7 mm.

The zone 28 of reduced thickness $e_2$ makes it possible to reduce the path travelled by the light of the beam F in the support layer 4. Such a reduction in the distance makes it possible to reduce the diffusion of the light inside the support layer 4 and to limit the influence of the crystallinity or the reinforcement of the support layer 4 on the path of the light.

Thus, the light arrives in the skin 2 without being diffused in the support layer, which makes it possible to obtain a pictogram 12 that is clearly defined relative to the rest of the skin, as represented in FIG. 2. The light is mostly diffused in the skin 2.

According to the embodiment represented in FIG. 1, the transition between the zone 26 of thickness $e_1$ and the zone 28 of thickness $e_2$ is made according to a substantially continuous transition slope, so as to reduce the thickness continuously between the first and the second thicknesses. The transition slope is, for example, less than or equal to 10%. Such a slope makes it possible to mask the transition between the zone 26 and the zone 28 from the outside and to retain the uniform aspect of the skin, which enhances the appearance of the trim panel 1. This slope also makes it possible to avoid the shrink mark phenomena when producing the trim panel 1. The transition slope and the reduced thickness zone 28 are produced directly in the manufacturing tool of the support layer 4. This tool is, for example, a mold. Thus, the reduced thickness zone 28 is particularly simple to produce and the trim panel 1 is inexpensive to produce.

The zone 10 can be uniformly or only partially lit so as to light a particular form of pictogram 12, as represented in FIG. 2. This form is, for example, produced by means of a mask 3 comprising at least one opening in the form of the pictogram 12. This mask allows the light to pass through its opening and blocks said light around the opening. The mask is positioned in the path of the light passage between the light source 14 and the translucent skin 2.

The mask is an add-on element or is printed directly on an element of the trim panel 1, for example by pad printing, diazo print, printing or hot marking techniques.

According to various embodiments, in the case of a printed mask, the mask is printed on the bottom face of the skin 2 or on the bottom face or the top face of the support layer 4.

In the case of an add-on element, the mask is placed between the skin 2 and the support layer 4 or between the support layer 4 and the light source 14, for example by covering the opening 18 of in the box 16.

In order to confer a particular appearance or color on the skin 2, the latter may be grained and the support layer 4 may be colored. In order to prevent the light passing from the outside to the inside of trim panel from being reflected by the light box when the pictogram is not lit, which would modify the appearance of the zone 10 relative to the rest of the skin, the box 16 is produced in such a way as to absorb the light, for example by using a black material. Thus, only the light originating from the light source 14 passes through the flexible layer 4 and through the skin 2.

The trim panel described hereinabove makes it possible to obtain a pictogram 12 that is sharply lit without overflowing around the pictogram because of the short path travelled by the light in the support layer 4. Furthermore, the skin has a uniform appearance when the pictogram is not lit.

The trim panel described hereinabove can be used in particular as a motor vehicle dashboard or to line the doors or the roof of the vehicle.

The invention claimed is:

1. A trim panel (1) for motor vehicles, of the type comprising at least one zone (10) forming a pictogram (12), said pictogram (12) being illuminated by means of a light source (14) placed under the trim panel (1), the trim panel (1) comprising a translucent skin (2) forming the external surface (8) of the trim panel (1) and a support layer (4) placed against the skin (2) between the light source (14) and at least the zone (10) forming the pictogram (12), wherein the support layer (4) has at least one first thickness ($e_1$) around the zone (10) forming the pictogram (12) and at least one second thickness ($e_2$) facing the zone (10) forming the pictogram (12), the second thickness ($e_2$) being less than the first thickness ($e_1$).

2. The trim panel as claimed in claim 1, wherein the support layer (4) is rigid.

3. The trim panel as claimed in claim 1, wherein the transition between the first thickness ($e_1$) and the second thickness ($e_2$) is made according to a substantially continuous transition slope, so as to reduce the thickness continuously between the first and the second thicknesses.

4. The trim panel as claimed in claim 3, wherein the transition slope is less than or equal to 10%.

5. The trim panel as claimed in claim 1, further comprising a mask comprising at least one opening in the form of the pictogram (12), said mask allowing the light to pass through the opening and blocking said light around the opening, said mask being positioned in the path of the light passing between the light source (14) and the translucent skin (2).

6. The trim panel as claimed in claim 5, wherein the mask is placed between the translucent skin (2) and the support layer (4) or between the support layer (4) and the light source (14).

7. The trim panel as claimed in claim 6, wherein the mask is printed on the internal surface of the translucent skin (2) or on the top surface or on the bottom surface of the support layer (4).

8. The trim panel as claimed in claim 6, wherein the mask is an independent element.

9. The trim panel as claimed in claim 1, wherein the support layer (4) is made of a glass-fiber reinforced polymer material.

10. The trim panel as claimed in claim 1, wherein the first thickness ($e_1$) is substantially comprised between 2.5 mm and 3 mm and the second thickness ($e_2$) is substantially comprised between 1 mm and 2 mm.

11. The trim panel as claimed in claim 1, wherein the support layer (4) comprises fixing means (20) for a box (16), the light source (14) being placed in said box (16).

12. A motor vehicle comprising a trim panel (1) as claimed in claim 1, said trim panel (1) being applied against at least a portion of the passenger compartment of said motor vehicle.

13. The trim panel as claimed in claim 2, wherein the transition between the first thickness ($e_1$) and the second thickness ($e_2$) is made according to a substantially continuous transition slope, so as to reduce the thickness continuously between the first and the second thicknesses.

14. The trim panel as claimed in claim 13, wherein the transition slope is less than or equal to 10%.

15. A trim panel for motor vehicles, comprising:
- a translucent skin forming an external surface of the trim panel;
- a support layer placed against the skin; and
- a light source configured and arranged to illuminate a pictogram in a first zone of the trim panel, the light source being under the translucent skin and support layer,
- wherein a thickness of the support layer in the first zone is less than a thickness of the support layer in an area surrounding the first zone.

16. The trim panel as claimed in claim 15, wherein the thickness of the support later in the first zone gradually increases to the thickness in the area surrounding the first zone.

17. The trim panel as claimed in claim 1, further comprising a mask including at least one opening in the form of the pictogram, said mask being positioned in the path of the light passing between the light source and the translucent skin.

18. The trim panel as claimed in claim 15, wherein the thickness of the support layer in the first zone is between 1 mm and 2 mm.

19. The trim panel as claimed in claim 18, wherein the thickness of the support layer in the area surrounding the first zone is between 2.5 mm and 3 mm.

20. A motor vehicle comprising a trim panel as claimed in claim 15, said trim panel being applied against at least a portion of the passenger compartment of said motor vehicle.

* * * * *